United States Patent [19]

Johnson et al.

[11] Patent Number: 5,060,980
[45] Date of Patent: Oct. 29, 1991

[54] FORM UTILIZING ENCODED INDICATIONS FOR FORM FIELD PROCESSING

[75] Inventors: Walter A. L. Johnson, Santa Clara; Baldo A. Faieta, Stanford; Z. Erol Smith, III, Palo Alto, all of Calif.

[73] Assignee: Xerox Corporation, Stamford, Conn.

[21] Appl. No.: 530,753

[22] Filed: May 30, 1990

[51] Int. Cl.⁵ .............................................. B42D 15/00
[52] U.S. Cl. ...................................... 283/70; 283/57; 283/115
[58] Field of Search ..................... 283/115, 74, 70, 59, 283/58, 57, 117; 340/825.34; 235/454, 494, 375

[56] References Cited

U.S. PATENT DOCUMENTS

| | | | |
|---|---|---|---|
| 3,643,069 | 2/1972 | Kikuchi | 235/454 |
| 3,933,094 | 1/1976 | Murphy et al. | 101/426 |
| 4,013,997 | 3/1977 | Treadwell, III | 340/146.1 |
| 4,248,528 | 2/1981 | Sahay | 355/14 R |
| 4,254,329 | 3/1981 | Gokey et al. | 235/454 |
| 4,478,584 | 10/1984 | Kaney | 283/115 |
| 4,494,862 | 1/1985 | Tanaka | 355/14 C |
| 4,588,211 | 5/1986 | Greene | 283/70 |
| 4,634,148 | 1/1987 | Greene | 283/70 |
| 4,665,004 | 5/1987 | Drexler | 430/140 |
| 4,704,517 | 11/1987 | Campisi et al. | 235/375 |
| 4,724,309 | 2/1988 | Greene | 235/468 |
| 4,728,984 | 3/1988 | Daniele | 355/6 |
| 4,757,348 | 7/1988 | Rourke et al. | 355/6 |
| 4,786,940 | 11/1988 | Daniele | 355/6 |
| 4,864,111 | 9/1989 | Cabili | 235/494 |

FOREIGN PATENT DOCUMENTS

0332557  9/1989  European Pat. Off. .

OTHER PUBLICATIONS

Documentation covering a product called the "Laser Archivist." Copyrighted 1986.

Primary Examiner—Mark Rosenbaum
Assistant Examiner—Hwei-Siu Payer
Attorney, Agent, or Firm—Jonathan A. Small

[57] ABSTRACT

A form including user modifiable fields and an encoded description of the location, size, type, etc. of the fields allows direct programming of a form interpreter. Other information including the processing of the form, encoded data, etc., may be included in the encoded information. A system for creating forms carrying an encoded description of selected attributes of the fields includes means for selecting or creating fields and locating the fields on a form while generating, substantially simultaneously, the encoded description of the selected attributes. A form composer then allows merging of the form and its encoded description for printing or electronic transmission. A system for reading such forms includes a scanner, decoding device, and processor. By reading such forms, data may be entered into or recalled from a data processing system, or a form interpreter may be programmed, locally or remotely, for subsequent handling of forms.

6 Claims, 5 Drawing Sheets

FORM UTILIZING ENCODED INDICATIONS FOR FORM FIELD PROCESSING

CROSS REFERENCE TO RELATED APPLICATIONS

The present application is related to the patent application of Zdybel et al. entitled "Hardcopy Lossless Data Storage and Communications For Electronic Document Processing Systems," filed on or about the same date as the filing of the present application, and incorporated by reference herein.

BACKGROUND OF THE INVENTION

The present invention relates generally to document processing, and more specifically to documents having printed thereon indicia of the position, size, type, and the like, of fields which may contain data to be extracted from the document, and systems for producing and utilizing same.

Machine readable forms have been in common use for some time. Such forms provide a mechanism for enabling actions to be taken based on marks on a paper without requiring human intervention such as reading or interpreting the forms. The marks on such forms are extracted under the control of a device commonly referred to as a form interpreter. The forms are "read," most often optically by a scanner or the like, and the form interpreter then locates and characterizes the marks on the forms, and may output control signals as a function of the presence, location, nature, etc., of the marks to peripheral devices.

A "form" of the type discussed above is defined for the purposes of the present invention as either a tangible printed document or the like or a data structure representing such a tangible printed document. The form may contain regions of arbitrary text, arbitrary graphics, and fields. "Fields," as used herein, is taken to mean regions of the form, either physical regions of the printed document or structured regions of the data structure representing the printed document, which are to be modified by a user. As used herein, a "user" may be either human or machine. Further, as used herein "modify" shall be taken to mean enter, add, delete, change, alter, connect, disconnect, highlight, fill-in, erase, strike-out or the like, when referring to a field. Examples of fields include "check box" fields (also called "bubbles"), alpha or alpha-numeric fields, image fields, etc. A form will often also include a reference point indication from which the location of the fields may be measured.

Information carried by forms can conveniently be divided into three categories: data, machine instructions, and other information. As used above, data is taken to mean information carried by the form to be read or extracted from the form for processing. Examples of data include blank or filled-in bubbles on a standardized examination answer form, payee fields on checks which are parsed for processing, etc. Machine instruction as used above refers to information carried by a form which is interpreted by the forms interpreter and which causes action either by the forms interpreter or by a remote device. Examples of machine instructions include information located on a form which, when read, cause data to be copied to or from memory locations of a computer, cause a mathematical or logical procedure to be applied to particular data, etc. Other information, as used above, refers generally to information ignored by the form interpreter, such as the arbitrary text and graphics mentioned above, prompts or instructions on the form to aid the user in filling in fields, information for the user's interest, ornamental treatment, etc. The first two categories of information, data and machine instructions, are of interest herein.

Forms carrying data are the most common type of form, and examples may be readily found in the art. For example, U.S. Pat. Ser. No. 4,634,148, to Greene, issued Jan. 6, 1987, teaches a form which is a draft check carrying data in the form of payee, amount, and maker. The fields carrying the data are located and the data is extracted for processing according to a preprogrammed scheme. Forms carrying instructions interpreted and used by machines are also known, for example for Rourke et al., U.S. Pat. No. 4,757,348, issued July 12, 1988. Rourke et al. discloses an electronic reprographics/printing system which uses printed control forms, called separators, to segregate groups of documents from one another and to input control or programming instructions for processing the documents associated with each control form. In fact, forms carrying data as well as machine instructions are known, for example as taught by Tanaka in U.S. Pat. No. 4,494,862, issued Jan. 22, 1985. Tanaka describes a system wherein a form is given a bar code which, when interpreted by the forms interpreter section of the system, causes the system to read and print only those rows on the form marked with a special pen (see, e.g., col 8, lines 32 et seq.)

Another reference of interest is the patent to Daniele, U.S. Pat. No. 4,728,984, issued Mar. 1, 1988. This reference relates to a system including an electronic printer for recording digital data on plain paper, together with the use of an input scanner for scanning digital data that has been recorded on such a recording medium to upload data into an appropriate device such as a computer or the printer itself. The applications of the system of this reference, however, are limited to decoding secret documents and inputting program information into a computer.

Forms of the data carrying type may in fact carry several different types of user applied data. For example, the above mentioned bubbles on a standardized examination answer form and the payee fields on checks which are parsed for processing represent two different types of data. In general, the data types are: digitally coded data, for example the filled-in or not filled-in state of a bubble; data for character recognition, such as bar codes, alpha-numerical data for optical character recognition (OCR) and the like; and data for image-wise handling, such as the payee field mentioned above, graphics and the like.

It is important for a practical form-using system to be able to distinguish between the various data types. One method for doing so is disclosed by Greene in U.S. Ser. No. 4,558,211, issued May 13, 1986. This reference discloses a machine readable document having fields identified by a coating of fluorescent ink. Data is written into the fields by the user on top of the fluorescent ink such that when the fields are illuminated by a proper light source, the written data will be black in sharp contrast to the fields. The fields include a binary coding which is applied by selectively blanking out regions of the fluorescent ink at the border of the fields, or regions of fluorescent ink remote from but logically associated with the field, for example as shown in FIG. 5, and discussed at col. 7, line 14, through col. 8, line 6. Greene distinguishes between the various data types by using the coding to cause different fields to be copied to different locations for printing.

Although machine processing of forms results in high speed and accuracy of processing, the systems disclosed in the previously mentioned references have several important limitations. These limitations have, inter alia, forced the use of machine read forms to be practical only when large numbers of identical forms are used, limited the organization and aesthetics of forms, and complicated the form creation process.

First, the form interpreter must be preprogrammed with a description of the form in order to locate the form fields. In most cases, a description of the physical location of the fields or parts of the fields relative to a reference point must be preprogrammed. This preprogramming requires substantial time, effort, and training, and most often is performed by an operator different from the person making up the form itself. Generically, there is a presently infilled need in the art for a form, electronic or paper, which may be interpreted by a general form parser that has no previous knowledge of the form.

A second limitation is that any encoded instructions relative to specific data must either by physically part of the data field or otherwise physically or logically associated with the data field. It is desirable for form organization and aesthetics to be able to locate instructions (as well as other relevant information about form content and structure) at any arbitrary position a form designer chooses.

A third limitation is that a form designer has had to separately create fields then add supplemental information, such as coded field type, if coded information about the fields is to be carried by the form. It is desirable to allow simultaneous creation of a form and creation of a coded description of the form. That is, a form creation system is needed that allows a form designer to create a form such that the system keeps track of the position, type, etc. of fields of the form, and automatically includes the coded description in the form's data structure and/or automatically prints the coded information on a printed copy of the form together with the alphanumerics, graphics and other elements of the form.

A fourth limitation is that present form interpreters require manual reprogramming prior to form interpretation. However, a form interpreter system is desired which works with coded forms to read from the form instructions on extraction and handling of the data and other information the form carries.

Related to this limitation is another limitation—it has heretofore not been possible to remotely program a form interpreter. That is, presently, to program a form interpreter the programmer must have direct physical access to the workstation, personal computer, or the like, which controls the interpreter. A method and apparatus is desired for programming the interpreter remotely, say via a paper form, transmitted to the interpreter by facsimile, via communication directly from the work station or personal computer the form resides on, etc.

Yet another limitation is that the above described art is not capable of designating a field as more than one data type. That is, it has hereto fore not been possible to designate the contents of a field for a variety of different processing. The ability to so designate the contents of a field for multiple processing avoids the need for rescanning, saving both processing time and computer memory space.

The realization and overcoming of the above limitations, and others not mentioned herein, form aspects of the present invention, which is summarized and described by way of illustrative embodiments below.

SUMMARY OF THE INVENTION

The present invention encompasses a novel form and systems for creating and interpreting such a form. The form itself, whether represented electronically or printed in hard copy, carries an encoded description of itself. The form may include one or more of a variety of types of fields, as well as other non-field information. The form generation portion of the system automatically encodes information about the fields as the form is being created, and integrates that encoded information into the electronic and printed representations of the form. The forms interpreter portion of the system may then read the form's field description from the form itself and, based on this description, interpret the form. By locating encoded information about form fields directly on the form, the form interpreter may be quickly, simply and automatically programmed for that particular form. Thus, it becomes practical to use specialized forms. The programming of the interpreter by the encoded form information may be by scanner or, remotely, by facsimile. The system also is capable of allowing direct station to station communication of the forms via facsimile or network communication protocols. Furthermore, the resulting forms, when in hard copy format, may be reproduced using standard office duplicating equipment.

The system includes:

A forms description language;

A computer based editor for creating and printing forms;

Computer software to convert a facsimile input into an image file; and

Computer software to process the image file, either from facsimile or from a scanner, so as to retrieve the form's description and interpret the form.

The form may be structured in virtually any manner, and include arbitrary text, arbitrary graphics, and a variety of fields such as check boxes, alpha-numeric, and/or image fields among others. In addition, the form will include encoded information. In the hard copy representation of the form, this encoded information may be printed on the face of the form. In the electronic representation of the form, the encoded information will be part of the data structure of the form. The encoded information will either be in a predefined location so that the interpreter may be programmed to look for it in that location, or the form may be searched for its location. In either case, the form will also include a reference point from which the form's layout is calculated.

The nature of the particular coding scheme is not important to the present invention, other than that whatever scheme is used, it must be able to encode the information compactly enough that room is not displaced which is needed for the fields themselves. Examples of acceptable coding schemes include barcodes, morphological glyphs, etc.

The system is composed of several components including a computer-based form design tool and interpreter. The form design tool allows the user to choose or create a variety of fields such as check boxes, alphanumeric or graphic fields, etc. When the user creates a form, the design tool automatically creates a description of the form. When the user selects and locates a field on the form, the form design tool incorporates a description of the field, including the type or types of field and its location, into the form description. When the form is printed, an encoded description is automatically printed on the form. The user may supplement the type and location information with other information, such as an operation to be performed on the contents of a field, specific interrelationships between contents of two or more fields, other action to be taken, etc. This supplemental information also becomes part of the form description which is encoded by the design tool.

The interpreter will typically be embedded in software. It will accept information from a scanner and be capable of culling from the scanner information the encoded information representing the form description. The interpreter will interpret the encoded information and perform either preprogrammed operations on the information located in specified fields or of a specified data type, or perform operations on that information from instructions encoded with the form description itself.

Distinguishing between the various data types and machine instructions by indications carried by the form itself are of particular interest herein. A form virtually complete unto itself (i.e., carrying data and instructions relating to that data) conserves valuable memory space on computers used in a form handling system, reduces programming of the form interpreter, allows one form to be read on a variety of different machines or by a variety of different form handling systems, etc. Thus, the present invention provides a complete and convenient form processing system, overcoming the limitations of the prior art.

The scope of the present invention and the manner in which it addresses the problems associated with prior art methods will become more readily apparent from the following detailed description when taken in conjunction with the accompanying drawings and claims.

DETAILED DESCRIPTION

Figure 1:
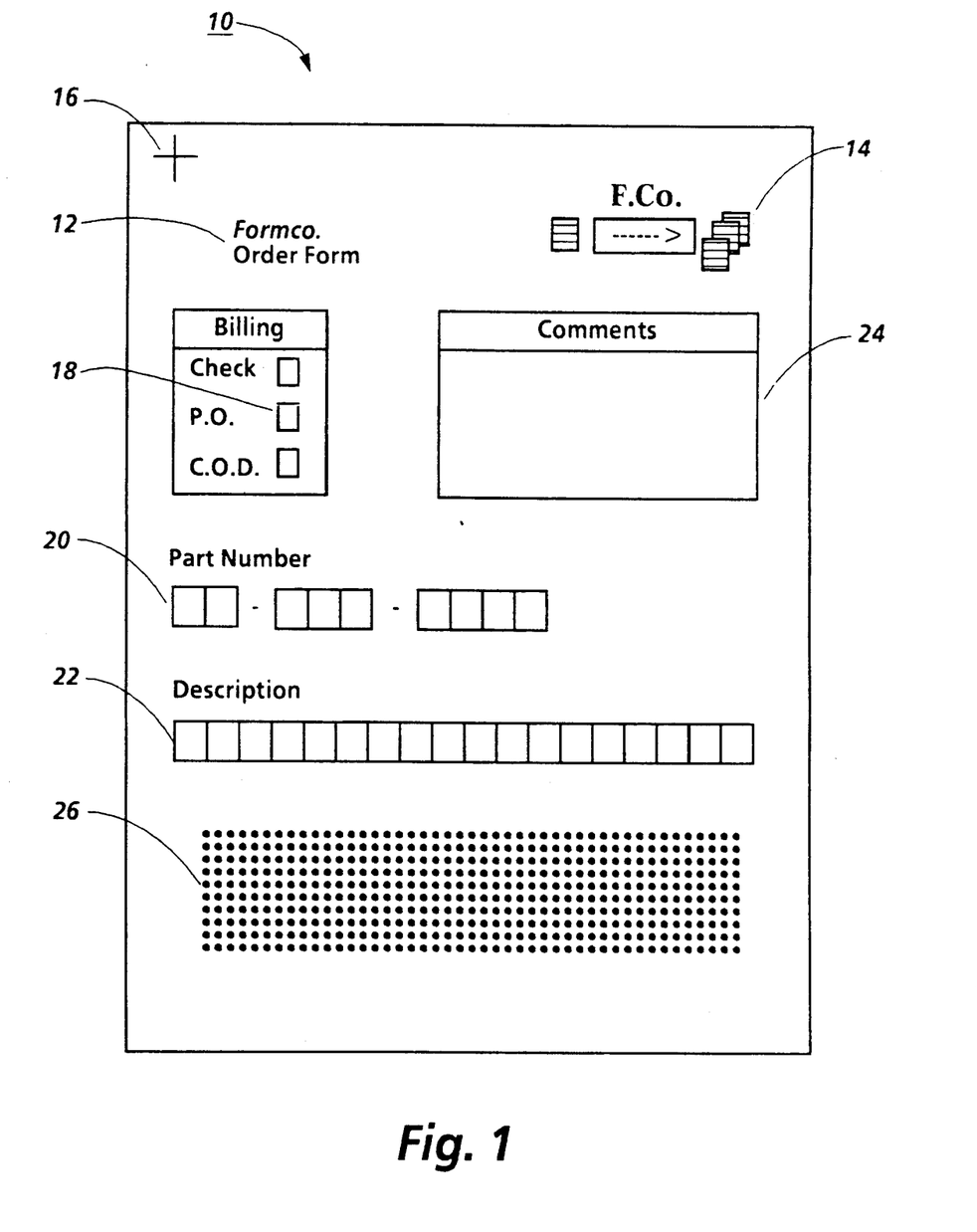
FIG. 1 shows one embodiment of a printed form according to the present invention.

Turning now to FIG. 1, one aspect of the present invention, a blank form 10 according to one embodiment of the present invention, is shown. The format of the illustrative form is a printed paper document, the paper itself being a common example of generic "carrier means," on which there may be imparted marking or "indicia" of various types. Form 10 is of the type on which a user may impart markings, which markings may be read or sensed by a machine such as an optical scanner. The markings imparted by the suer represent data, often of the type to be stored in a digital computer memory or the like. The markings imparted by the user need to be located at specific locations on the form so that the form interpreter may be instructed where to look for the data to be read. Thus, some aid needs to be provided to the user to facilitate proper location of the markings. To this end, form 10 will generally include printing prior to use, such as an outline of field regions to be filled in, borders of image fields, etc. To further assist a user in completing a form, printed instructions are often preprinted on the form itself.

The preprinting on form 10 may include arbitrary text 12, such as document or field titles, the above mentioned instructions and the like, and arbitrary graphics 14 such as graphical symbols, the above mentioned field outlines, etc. The length, size, position, content, and other details of the arbitrary text 12 and arbitrary graphics 14 do not impact the nature of the present invention. In fact, a form interpreter utilizing a form such as that described herein will ignore the arbitrary text 12 and arbitrary graphics 14 in favor of the contents of certain fields and encoded information regions.

In order to facilitate locating regions of form 10 marked for reading, i.e., fields, form 10 includes a reference point 16 from which the layout of the remainder of the form is calculated. The form interpreter locates this point, and measures position of the contents of the fields to be read therefrom. A convenient location for reference point 16 is the upper lefthand corner of the form. Thus, the location of any field may be described in terms of horizontal and vertical displacements from the reference point.

A form according to the present invention will include one or more arbitrarily located field regions, which include one or more fields of the type described above. These fields may be "check boxes" (or "bubbles") as indicated by reference numeral 18, single or multi digited numeric or alphanumeric fields, such as the multi digited numeric field 20, and/or the multi character alpha field 22. Image fields 24, i.e., regions of text, graphics or other information scanned and saved as a single image, are yet another type of field which may be located on document 10. Arbitrary graphics 14 should be distinguished from the contents, if any, of image field 24. Whereas the contents of field 24 will be maintained as data for processing, a form interpreter utilizing a form such as that described herein will ignore the arbitrary graphics 14, much as it will ignore the arbitrary text 12.

A region of encoded information 26 which represents a structural description of form 10, as well as other selected information, will be located on the form itself. The encoded information contained in region 26 includes, inter alia, the complete description of the location of the fields on the form which enables arbitrary placement of the fields on the form. In fact, region 26 may also be arbitrarily located. Specifically, region 26 need not by physically or logically placed on form 10 with reference to the fields. Rather, in one embodiment, the form interpreter is instructed where on form 10 region 26 may be found. Alternatively, the form may be searched for region 26, based on data type, format, etc. Once located, the information contained in region 26 may be read by a scanner and decoded by appropriate decoding means to provide the position information needed to read and process the remainder of the form. It is important to note that by providing a complete description of the location of the field on the form itself the fields may be arbitrarily located on the form. That is, the fields may be located at any position on the form convenient or desired.

The method of coding the information contained in region 26 may be by any convenient machine readable coding scheme. One example is the so called "bar codes" well known in the art. Another well suited scheme is described in U.S. Patent application entitled "Self-Clocking Embedded Digital Data," by Bloomberg, et al. This particular coding scheme allows a sizable amount of information to be encoded and carried by the form in an aesthetically pleasing format.

The encoded information carried by region 26 may include a description of any attribute of the form as described in the aforementioned copending patent application of Zdybel et al. ("Hardcopy Lossless Data Storage . . . "). However, at a minimum, the encoded information will include a description of the physical location of one or more fields on form 10, relative to reference point 16, and a description of the type of that one or more fields (i.e., bubble, alpha-numeric, image, etc.) Examples of the further types of information which may be carried by region 26 are instructions to a processor for specific processing of selected data, including data remote of form 10, dialing instructions to a facsimile machine acting as an interface between the document scanner and the form interpreter, network addresses for the routing of selected data, data itself which is to be processed, etc. The point here is that by providing a region of encoded information which ties directly to user modifiable fields, a form may be provided that is a direct path between user and form interpreter—no preprogramming of the form interpreter is required. Furthermore, programming of processing apparatus may also be accomplished by the encoded information, thus alleviating the need to preprogram that portion of a data processing system as well.

The above form description has been given with respect to a single page form. It will be appreciated that the foregoing description applies equally to single forms of more than one page. That is, each page of a multi page form should include a reference point, such as point 16, at least one field, such as fields 18, 20, 22, or 24 and a region of encoded information, such as region 26. However, it will also be appreciated that by proper coding of information in region 26, a form interpreter may be programmed to recognize pages of a form carrying less than all of the above. For example, a form interpreter may be programmed by reading the coded information of region 26 (by methods such as the one described further below) to skip one or more pages of a multi page form which do not contain fields. Likewise, the locations of fields on various pages could be programmed via a single encoded information region so that each page need not carry such a region.

Figure 2:
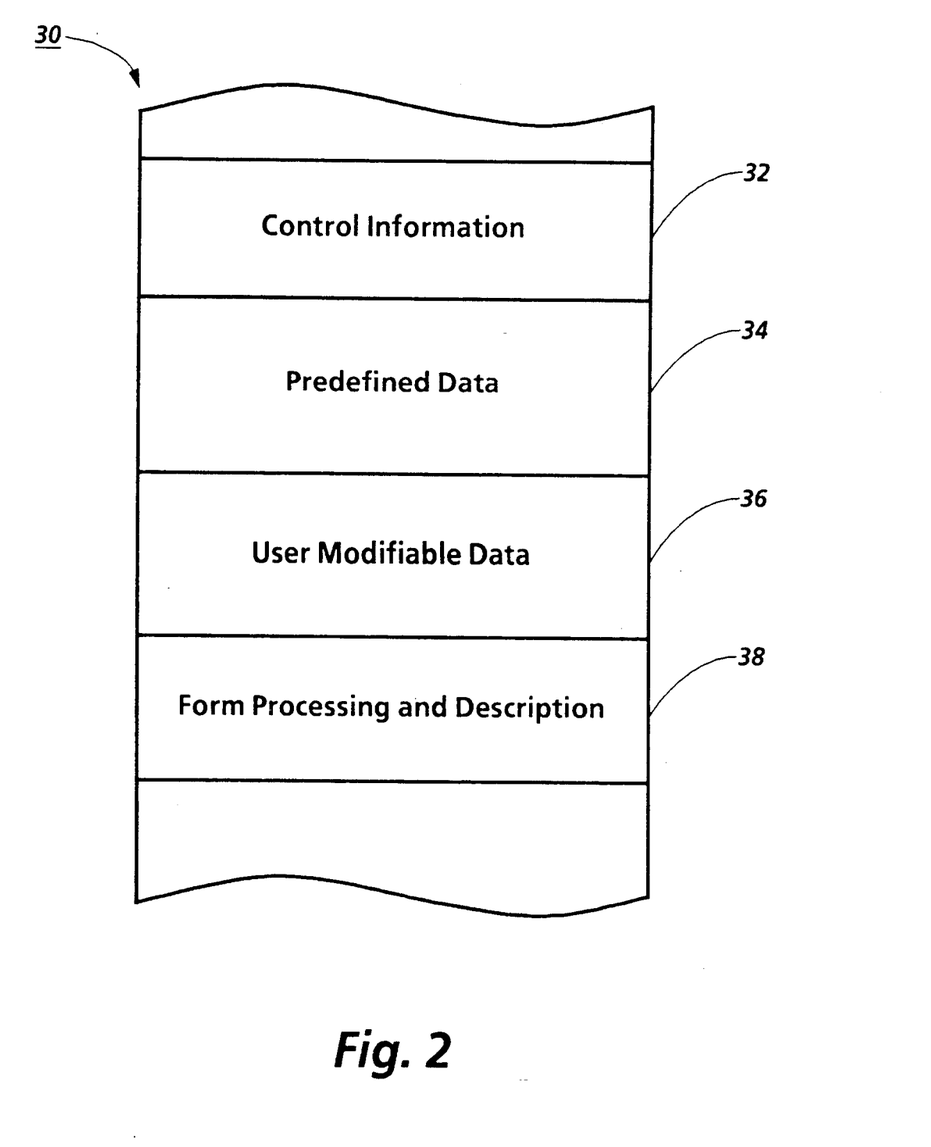
FIG. 2 shows one embodiment of a data structure representing a form according to the present invention.

The description above of the form aspect of the present invention has been from the point of view of a paper document. It will be appreciated, however, that the nature of the present invention lends itself equally well to an entirely electronic form, of the type that may be transferred from one portion of a data processing system to another, or from one data processing system to another. For example, an electronic form 30 may be a structure of digital data of the type shown in FIG. 2, including control information region 32, predefined data region 34, user modifiable (field) data region 36 and form processing and description region 38. Again, the form will have associated with it one or more fields and encoded information allowing a direct path between user and form interpreter. Here, however, the encoded information will be an indication of the location of field data in the data structure (i.e., pointer location or the like).

Figure 3:
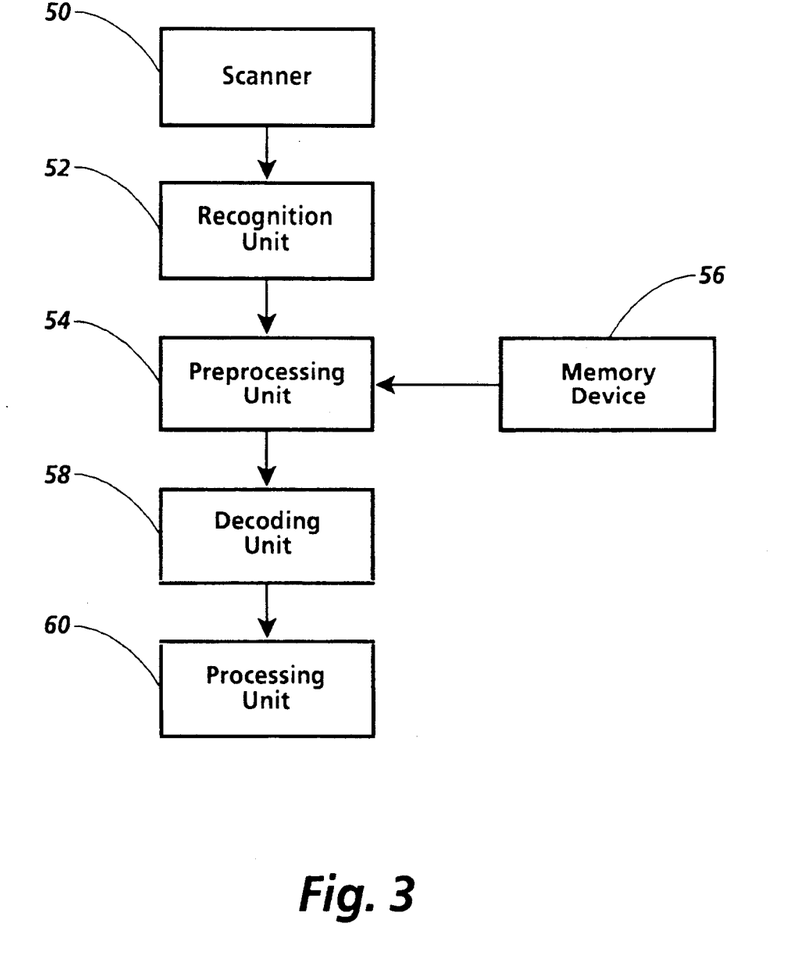
FIG. 3 is a flow chart of one embodiment of a system for the processing of a form carrying a coded description of the location, type, etc., of user modifiable fields according to the present invention.

Another aspect of the present invention is the processing of data by way of a form of the type described above. By way of example, a system for the processing of a form carrying a coded description of the location, type, etc., of user modifiable fields is shown in FIG. 3. According to the embodiment of the invention illustrated, the system comprises a scanner 50 of the type capable of converting the appearance or image of a form, such as form 10 of FIG. 1, into an electronic representation such as a bitmap or the like. The electronic representation of the form is passed from scanner 50 to a recognition unit 52 which includes recognition software for converting the bitmap or similar representation into elemental textual and graphical data blocks to the extent possible. For example, state-of-the-art recognition software generally can correlate printed typographic characters with their ASCII encodings with substantial success. Additionally, the recognition software is sometimes capable of inferring some or all of the page layout features of the form from its bitmap representation, thereby allowing identification of particular regions of information based on physical location, and capable of making probability-based determinations of character type or font of printed text, thereby allowing identification of particular regions of information based on character type. The aim at first pass through the form is to locate the region(s) of encoded information and to decode the information to allow further processing of the form. This may be done in one of at least two different ways. First, the encoded information region will be located form the location of a reference point and preprogrammed information about the location of the encoded region relative to the reference point. According to this method, recognition unit 52 will locate the reference point, such as reference point 16 on form 10, FIG. 1. Recognition unit 52 will then pass the reference point location information to preprocessing unit 54, which will cause displacement information to be called from memory device 56, such as a ROM unit, and add that displacement information to the reference point location information to obtain the beginning point of the encoded information region. The second method of locating the encoded information region assumes that recognition unit 52 is capable of uniquely identifying the characters or symbols comprising the encoded information region. In essence, recognition unit 52 scans the electronic representation of the form for a predefined data type, i.e., the specific symbols used for encoding. When the first of these glyphs are encountered, it may then be known that the encoded information region has been located.

Once located, the encoded information must then be decoded. This is the role of decoding unit 58. The input to decoding unit 58 will be the electronic representation of information encoded by one of the above mentioned encoding schemes. By way of example only, such information may include the location and type of a field, and a destination in computer memory at which to store the data contained in the field. The output of decoding unit 58 will be input to processing unit 60. The decoded information is then utilized by processing unit 60 to determine the physical location of the field, and to perform the designated operation upon the contents of the field, i.e., copy the contents into the specified memory location. It will be appreciated at this point that virtually any processing of the data contained in the field may be performed by processing unit 60. Several different operations may be performed on a single field's contents, and a single operation may be performed on the contents of several fields. Furthermore, there is no practical upper limit on the number of fields that may be processed in the manner described above. Thus, although not shown in FIG. 3, processing unit 60 will generally be in communication with peripheral units such as memory units, display units, printing units, etc., for peripheral processing of selected data.

As previously mentioned, the present invention contemplates processing forms entirely in their electronic representation. In such cases, there will be no printed copy of the form, and thus no need for scanner 50 in a system for processing such a form. Rather, if the electronic representation of the form is compatible with the capabilities of recognition unit 52, the electronic representation may be directly passed to recognition unit 52, and processing of the form is as described above. If, however, the electronic representation of the form is in a format incompatible with the capabilities of recognition unit 52, a translation or conversion unit (not shown) may be interposed between the form source and recognition unit 52, as will be readily appreciated by one skilled in the art.

Figure 4:
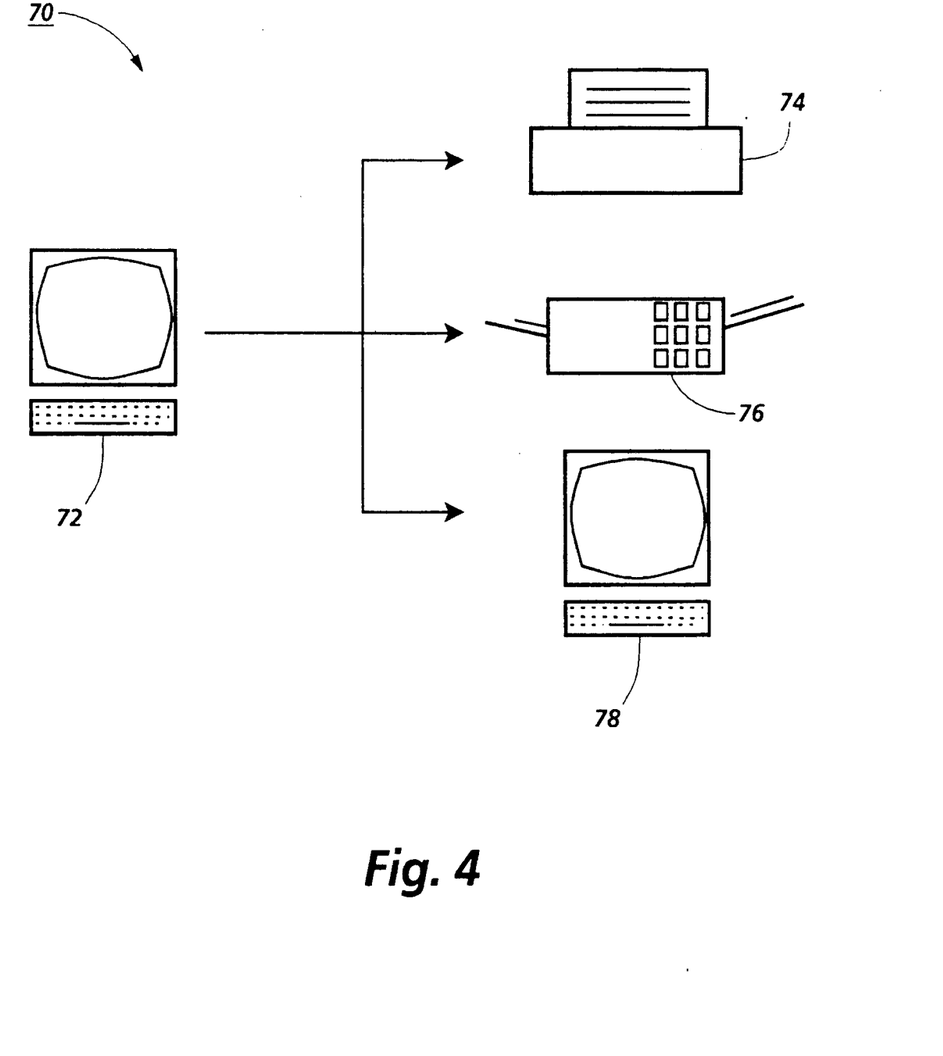
FIG. 4 shows one embodiment of a system for generation of a form carrying a coded description of the location, type, etc., of user modifiable fields according to the present invention.

Yet another aspect of the present invention is a system for the generation of a form which includes user modifiable fields and an encoded information region carrying information about the processing of the form. By way of example, FIG. 4 details such a system 70. According to this aspect of the present invention, a form of the type described above may be created on a device such as a personal computer (P.C.) or work station 72 having a form creation package resident thereon or accessible thereto. The P.C. or work station will generally be in communication with one or more peripheral devices such as a printer 74, a facsimile machine 76 or another P.C. or work station 78.

Figure 5:
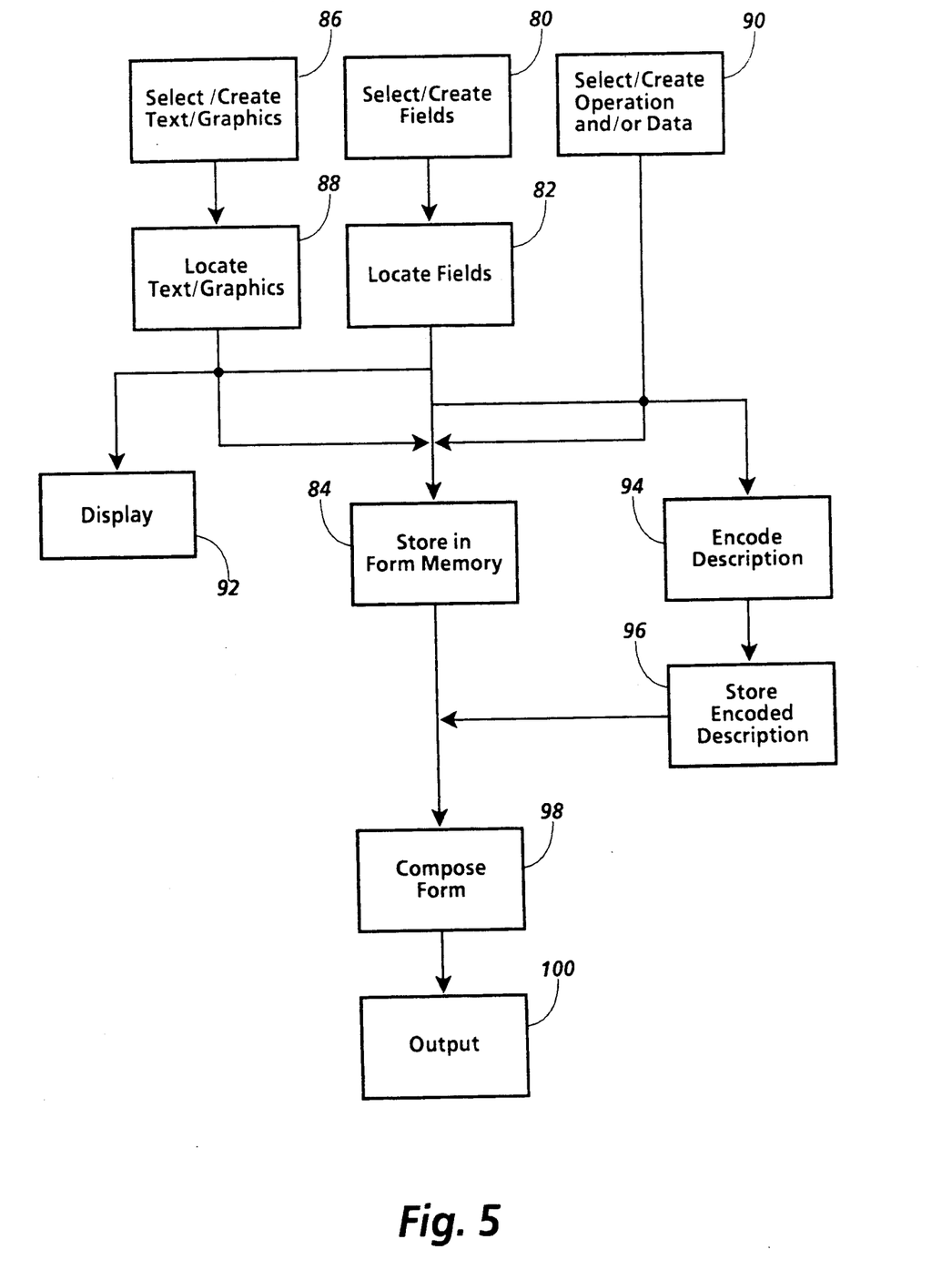
FIG. 5 is flow chart representation of a process for creating a form carrying a coded description of the location, type, etc., of user modifiable fields according to the present invention.

The system and steps utilized by the P.C. or work station 72 for creation of a form is detailed in FIG. 5. On a display presenting an image of the form, a user will select or create one or more fields, by way of a field source means, to be carried by the form at step 80. The field source means may be a field library, user interface device such as a keyboard, or other system input such as a scanner or the like. After selection or creation, a field is positionally located on the form at step 82, and information about selected attributes of the field, such as type, size, location, etc., is stored in a form memory at step 84. Similarly, a user may select of create and locate arbitrary text and graphics at steps 86, and 88 respectively.

As a field is selected or created, the user may wish to specify an operation or operations to be performed on later added contents of the field at 90. Operations and/or data independent of the contents of any field may also be entered at this point. Such an operation may be symbolically entered (e.g., c=a+b, a mathematical relationship where the contents of fields a and b are added and the result put in memory location c) or logically entered (e.g., if field x is filled-in, move the contents of field y to the memory location z). Data may be directly entered (e.g., move the value "5" into memory location 1). The operations and/or data may be selected from an operation library, or input on a user interface device such as a keyboard. Such operation and/or data will also be stored in the form memory at 84.

It may be desirable when displaying the fields, text, graphics, etc., not to include a display of the operations and/or data. Assuming that the operations and/or data are not to be displayed, the display function 92 may be interposed between the locate functions 82 and 88, and the form description memory function 84. The display function may, of course, be located elsewhere in the system for the purposes of displaying more or less information than fields, text, and graphics.

Virtually simultaneously with the creation of the form itself, an encoded form description is created. The encoded form description may or may not include the arbitrary text and graphics, as described above. Assuming for illustration purposes that the arbitrary text and graphics are not to be encoded, the step of encoding the relevant information is shown at step 94, interposed between the locate and select function 82 and 90, and the store in form memory function 84. The encoded information is next stored in an encoded description memory at step 96. Of course, the encoding of step 94 and storage of step 96 may be located elsewhere in the system for the purposes of encoding and storing more or less information than fields and operations. Furthermore, the makeup of the encoding apparatus used is a function of the scheme used to encode the information. In the schemes described above a look-up table is generally the interface between the uncoded and coded data. However, the details of the coding apparatus and scheme are beyond the scope of the present invention. The key point is that selected information is passed to a description encoder which creates an encoded version of the information, nearly, if not in parallel with the creation of the form itself.

For the purposes of printing the form or transmitting the form electronically for use, the form and its encoded description must be merged. This is done at step 98 by a form composer. The form composer will be preprogrammed with certain instructions about the placement of the text, graphics, fields and encoded information. For the purposes of a printed form, it is the role of the form composer to ensure that all of the relevant information is fit onto the printed page. For the electronic version of the form, it is the role of the form interpreter to properly located the various components of the form in the appropriate data structure. Once composed, the form may be output at 100. The form may be printed, sent via facsimile, sent via electronic network to P.C.s or workstations, etc., for copying, printing, editing or use.

In the case of a machine acting in the role of user, the machine would generate a form with encoded description in response to a request, instruction or the like in a manner similar to that described above. For example, a request may be made via computer of facsimile for information on a particular subject, eliciting a response in the form of a printed paper form with bubbles to be filled in representing available specific items on the particular subject which may be requested. The machine may assemble a form from a library of field types, following predefined layout instructions, while maintaining a description of the form to be ultimately encoded and printed on the form or made a part of its electronic description. Again, the resulting form may be hard-copy or an electronic representation of the form.

In general, to those skilled in the art to which this invention relates, many changes in construction and widely differing embodiments and applications of the present invention will suggest themselves without departing from its spirit and scope. For example, the above description has focussed on forms carrying encoded information representing the location, type, processing, etc., of the fields associated with a form. It is within the scope of the present invention, however, that a complete description of all of the contents of a form, including arbitrary text and arbitrary graphics be encoded enabling a complete re-editing as appropriate.

Also, the above description has been from the point of view of a form carrying its own encoded description for the purposes of processing. It will be appreciated, however, that a stand-alone encoded description could be used for the programming of a form interpreter to handle one or more forms to be interpreted. In addition, the encoded data could be or include an identifier which identifies the form so that the form interpreter may rely on a previously programmed description of the form.

Furthermore, use of individual aspects of the present invention, such as the form itself, have been described only by way of example, and such description is not intended to be in any sense limiting. For example, although a form may be used by directly marking the form with, say a pencil, then scanning the form to extract the imparted data, a form according to the present invention may also be used by displaying the form on a P.C., work station or the like and entering the data by means of an appropriate input device such as a keyboard, mouse, etc.

In summary, it will be appreciated that the present invention provides a simple and convenient way to access or store data, or program a form interpreter for the processing of data contained on a form. The present invention makes practicable the use of customized forms of forms used in small numbers, reduces the burden of programming the form interpreter, and reduces the required memory space associated with a form interpreter, among other benefits, by creating a direct correlation between an encoded description and processing of the form and the data the form carries.

What is claimed is:

1. A form for use in a machine data entry and retrieval system of the type including a decoding section for decoding encoded information carried by the form, comprising:

carrier means for carrying at least one type of indicia and upon which a user may impart or modify such indicia;

a field region arbitrarily located on said carrier means for receiving machine readable user imparted or modified indicia; and an encoded information region arbitrarily located on said carrier means for receiving machine readable encoded information representing selected attributes of said field region.

2. The form of claim 1, wherein said field region contains field data at a particular physical location on said carrier means and said encoded information region contains encoded information represents the location of the field data such that the data entry and retrieval system upon decoding the encoded information may locate and read the field data.

3. The form of claim 1, wherein said field region contains field data upon which a specified operation is to be performed and said encoded information region contains encoded information representing instructions to the data entry and retrieval system which will result in the operation being performed on said data.

4. A form for use in a machine data entry and retrieval system of the type including a decoding section for decoding encoded information carried by the form, comprising:

carrier means for carrying at least one type of indicia and upon which a user may impart or modify such indicia;

machine readable field data arbitrarily located on said carrier means which may be imparted or modified by a user; and encoded information arbitrarily located on said carrier means representing selected attributes of said field data.

5. The form of claim 4, wherein said field data is located at a particular physical location on said carrier means and said encoded information represents the location of the field data such that the data entry and retrieval system upon decoding the encoded information may locate and read the field data.

6. The form of claim 4, wherein said field data is of the type upon which a specified operation is to be performed and said encoded information represents instructions interpretable by the data entry and retrieval system which will result in the operation being performed on said data.

* * * * *